US005725194A

United States Patent [19]

Glynn

[11] Patent Number: 5,725,194

[45] Date of Patent: Mar. 10, 1998

[54] COMPUTER COMPONENT SECURITY DEVICE WITH TOP PLATE

[75] Inventor: Kenneth P. Glynn, Raritan Township, Hunterdon County, N.J.

[73] Assignee: Ideal Ideas, Inc., Flemington, N.J.

[21] Appl. No.: 649,012

[22] Filed: May 16, 1996

Related U.S. Application Data

[63] Continuation-in-part of Ser. No. 380,033, Jan. 30, 1995, and Ser. No. 592,057, Jan. 26, 1996.

[51] Int. Cl.[6] .................. F16M 13/00

[52] U.S. Cl. .................. 248/551; 248/553; 248/917; 248/918; 70/58; 70/63

[58] Field of Search .................. 248/228.6, 231.71, 248/500, 501, 551, 552, 553, 917, 918; 70/57, 58, 63

[56] References Cited

U.S. PATENT DOCUMENTS

| | | | |
|---|---|---|---|
| 4,456,315 | 6/1984 | Markley et al. | 214/918 X |
| 4,570,156 | 2/1986 | Nicholas, Jr. | 248/551 X |
| 4,585,202 | 4/1986 | Parsekian | 70/58 X |
| 4,600,250 | 7/1986 | Windham | 248/917 X |
| 4,624,510 | 11/1986 | Jedziniak | 248/917 X |
| 4,884,420 | 12/1989 | Finkel | 248/551 X |
| 5,052,651 | 10/1991 | Guddee | 70/58 X |
| 5,135,197 | 8/1992 | Kelley et al. | 248/918 X |
| 5,288,042 | 2/1994 | Grimm | 248/918 X |
| 5,450,271 | 9/1995 | Fukushima et al. | 248/553 X |

OTHER PUBLICATIONS

IBM Thinkpad, Dock I User's Guide (1993), 1st Edition, pp. 3–4.

*Primary Examiner*—Leslie A. Braun
*Assistant Examiner*—Richard M. Smith
*Attorney, Agent, or Firm*—Kenneth P. Glynn, Esq.

[57] ABSTRACT

The present invention is a computer component securing device, which has a main housing having a storage portion and a pair of table securing portions, a positioning means, a locking means, and a table securing means. The positioning means positions a computer component so as to have a first, open position wherein the computer component may be inserted and removed from the storage portion and so as to have a second, closed position such that an inserted computer component cannot be removed therefrom, but so as to expose the functional aspects of the computer component for utilization by a user when the positioning means is in its second, closed position. The positioning means is attached to said main housing. The locking means is connected to the positioning means and the main housing and is adapted so as to permit locking and unlocking of one of the positioning means and the main housing when the positioning means is in its second, closed position. The table securing means extends through at least one opening in the securing portion.

18 Claims, 4 Drawing Sheets

COMPUTER COMPONENT SECURITY DEVICE WITH TOP PLATE

REFERENCE TO RELATED APPLICATION

This application is a Continuation-In-Part of currently pending U.S. patent application Ser. No. 08/380,033, filed on Jan. 30, 1995 and entitled "Computer Component Security Device" by the inventor herein and currently pending U.S. patent application Ser. No. 08/592,057 filed on Jan. 26, 1996 and entitled "Computer Component Security Device with Parallel Table Securing Means" by the inventor herein.

BACKGROUND OF THE INVENTION

1. Field of the Invention

The present invention relates to computer component security devices, and, more particularly, to such devices which may be used for attachment to a table for subsequent long or short term attachment, with subsequent removal and which can secure computer components without removing the cables and other wiring.

2. Information Disclosure Statement

Generally, computer security systems are either bolted to tables or require chains or wires looped around legs and thus being vulnerable to casual theft, e.g., merely by lifting the table and dropping the computer and chain down to remove it. Typical is International Business Machine's Security Hook for their Dock I® computer docking station. See IBM's IBM ThinkPad, Dock I Users Guide (1993), First Edition, page 3–4.

Another computer component securing device is a patent pending in which a C-clamp is modified to contain a lock attached to cable which threads through the C-clamp causing the C-clamp to remain clamped in place when the lock is locked. The cable is relatively easily capable of being cut, thus making the computer component readily available to theft. Moreover, the invention does not offer the expansive coverage of the present invention which allows a computer monitor and CPU to be secured with one set of bolts or clamps.

Notwithstanding the prior art, there seems to be no security systems for safely securing a computer component to a table, except for ineffective systems, and none renders the present invention obvious or unpatentable thereover. Moreover, the present invention can secure a CPU and monitor without removing the connected cables and other wiring.

SUMMARY OF THE INVENTION

The present invention is a computer component securing device, which has a main housing having a storage portion and a pair of table securing portions, a positioning means, a locking means, and a table securing means. The storage portion is adapted to store a computer component and is attached to each table securing portion.

Each table securing portion has a bottom, one sidewall, and a back, and at least one cutout in the bottom for passing a table securing device at least partially therethrough. The positioning means positions a computer component so as to have a first, open position wherein the computer component may be inserted and removed from the storage portion and so as to have a second, closed position such that an inserted computer component cannot be removed therefrom, but so as to expose the functional aspects of the computer component for utilization by a user when the positioning means is in its second, closed position. The positioning means is removably connected to the main housing.

The locking means is connected to the positioning means and the main housing and is adapted so as to permit locking and unlocking of one of the positioning means and the main housing when the positioning means is in its second, closed position.

The table securing means extends through the at least one opening in the securing portion and is connected to the securing portion inside the securing portion, and has an attachment mechanism outside of the securing portion which is securably connectable to a table, wherein the table securing means may be attached to a table from operating it from the inside of the securing portion and, when the positioning means is in its second, closed position and is locked, the table securing means cannot be unattached from the table without damaging the device or a table to which it is attached.

BRIEF DESCRIPTION OF THE DRAWINGS

The present invention will be more fully understood when the specification herein is taken in conjunction with the drawings appended hereto, wherein.

DETAILED DESCRIPTION OF THE PRESENT INVENTION

The purpose of the present invention is to provide a computer component security device to enable computer users at high risk or other locations to secure computers, computer components, or similar devices, e.g. an IBM® PS/1 CPU and monitor. The devices may be used for general security, for absentee downloading and the like, while having the computer component and the present invention itself secured and locked to a table, to discourage and inhibit theft.

The present invention devices are generally reasonably sized, lightweight and are securable to a table, but easily removable at the end of use at that location. When a C-clamp or the like is used as part of the security device, the device is inert to its environment, i.e. it does not damage the table or desk to which it is attached. All of the devices do not damage the computer component (it needs no drilling, bolting or other alterations). Further, the devices are mechanically adaptable to different size tables and are reasonably invulnerable to a potential thief, including strength and cutting considerations. In addition, the devices use a minimum amount of components while at the same time allowing for a table securing mechanism.

The present invention devices have various embodiments adaptable to smooth tables, rough tables, tables with ledges (overhangs) and tables without ledges. There could be tables of any foreseeable depth and width, but most tables would be of reasonable size and thickness. For some applications it is assumed that the tables have smooth, solid surfaces. (By "tables" as used herein is meant any flat surfaced finishing on which computers and/or computer components may be used, including, but not limited to, conventional tables, desks, shelves, credenzas, computer work stations, cabinets and other office furnishings.)

The devices contemplated by the present invention herein are attachable to a table and otherwise meet the objectives set forth above. They can be manufactured in various sizes so that various size computers can be secured and locked. The device operates equally effectively by being attached to either the front or the back of a table.

Figure 3:
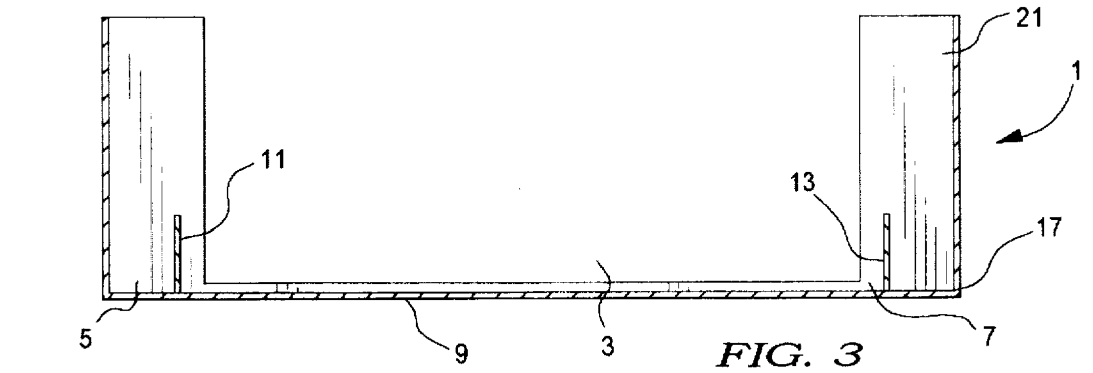
FIG. 3 shows a back inside cut view of the main housing shown in FIG. 1.
Figure 1:
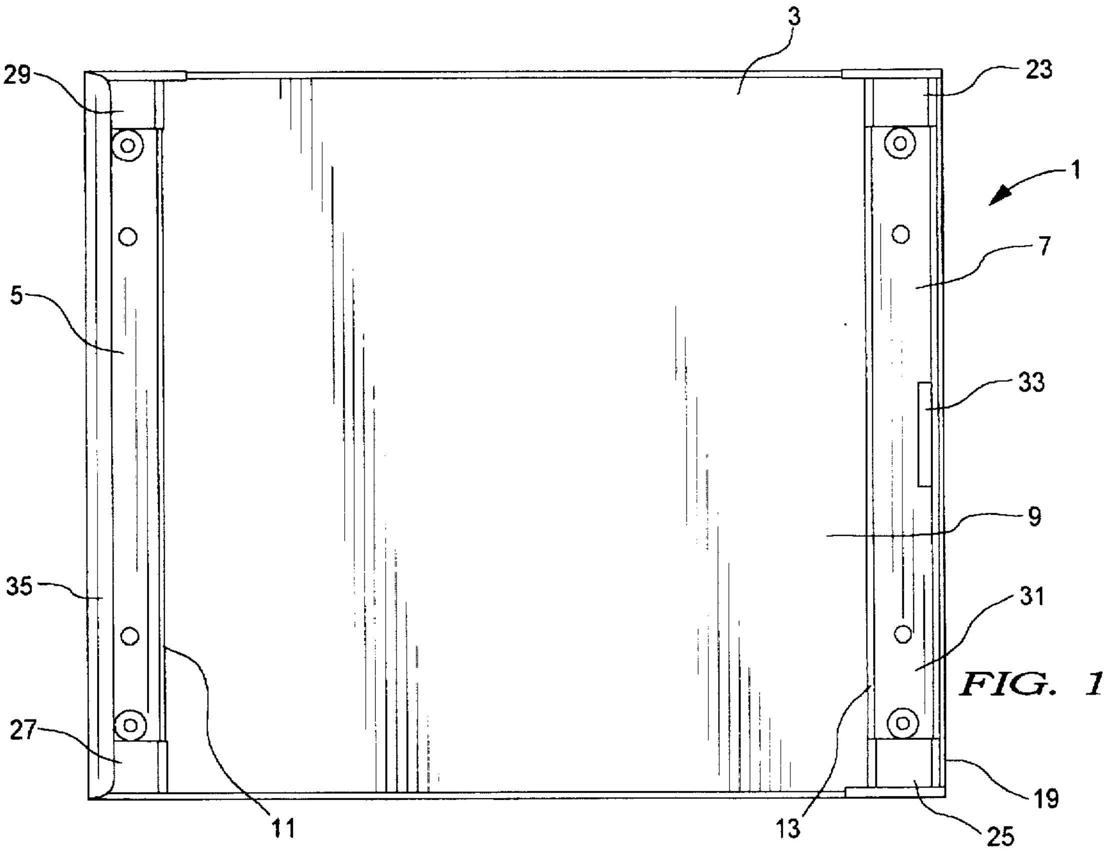
FIG. 1 shows a top view of a present invention main housing.
Figure 2:
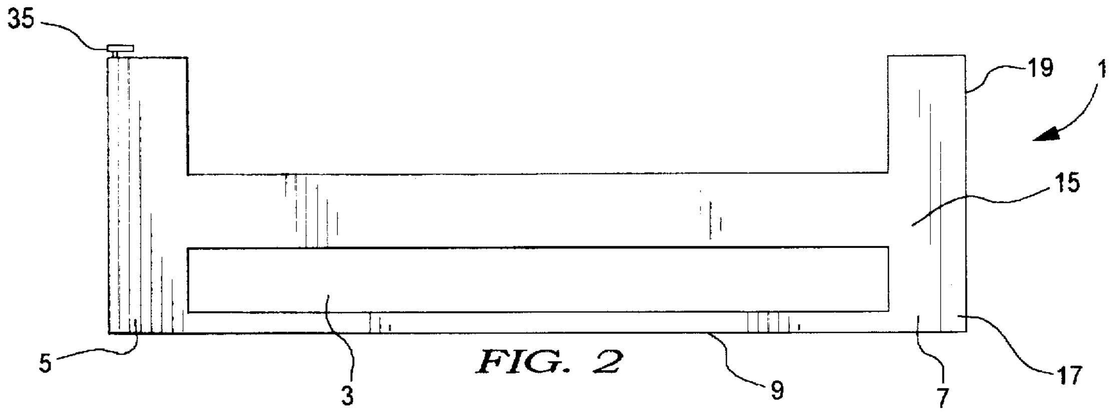
FIG. 2 shows a front view of the main housing shown in FIG. 1.

Referring to FIGS. 1, 2 and 3, there is shown a present invention device main housing 1 having a storage portion 3 and a pair of table securing portions 5, 7. The storage portion 3, which is sized and shaped to house a CPU such as an IBM® PS/1 CPU and monitor or other similarly sized and configured computer component, includes a bottom 9, sidewalls 11, 13, and a partially open front 15. The partially open front 15 allows for access to the functional parts of the CPU. An open back allows for access to the ports and wiring aspects of the CPU.

Each table securing portion includes a bottom 17, an outer sidewall 19, a back 21, at least one cut-out 23, 25, 27, 29 in the bottom 17 for passing a table securing means at least partially therethrough and a channel 31 extending along an inner dimension of the sidewall 19. A C-clamp table securing means 139 (see FIG. 4) is connected to the channel 31.

Projecting from below a top edge of the sidewall 19 is a tab hole 33 which is located on just one of the table securing portions 7. The tab hole 33 engages a lock, when locked from a top of the top plate 37 (see FIG. 6) Extending over the top of the other table securing portion 5 is a ledge 35 for sliding the top plate 37 thereinto.

Figure 4:
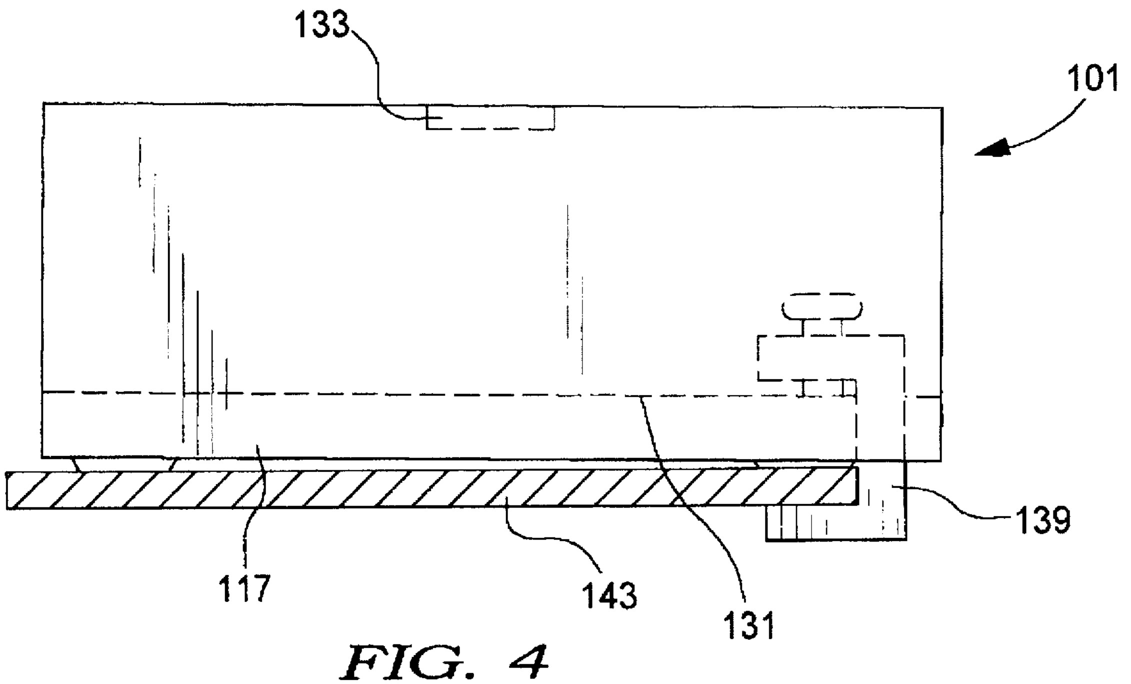
FIG. 4 shows a side view of the main housing shown in FIG. 1 attached to a table and having a C-clamp securing means.
Figure 5:
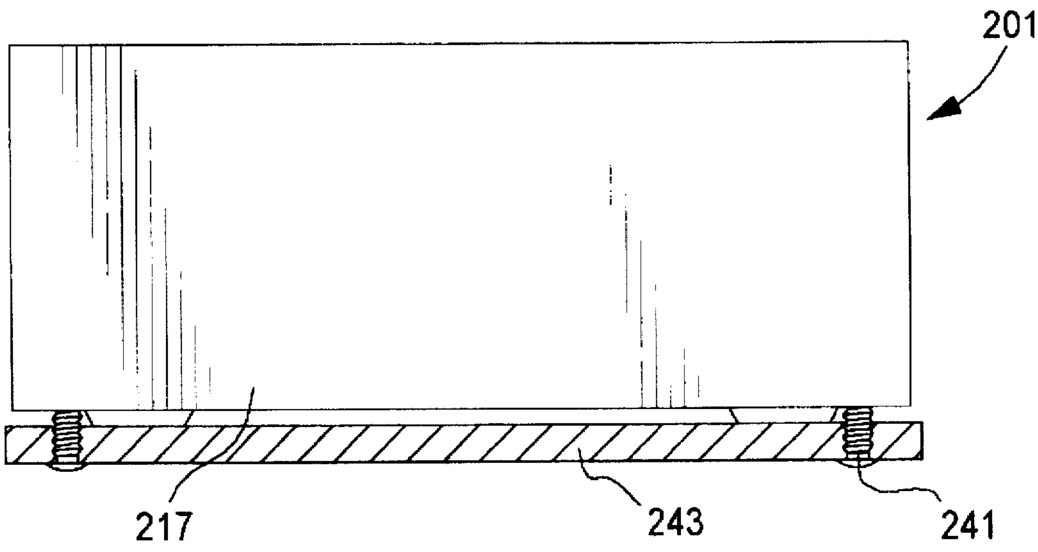
FIG. 5 shows a side view of the main housing shown in FIG. 1 attached to a table and having a carriage bolt securing means.

FIGS. 4 and 5 show a present invention device main housing 101, 201 attached to a table 143, 243 by table securing means. The table securing means may be a C-clamp 139 or a carriage bolt 241. Like parts are similarly numbered to those in FIGS. 1, 2, and 3, but incremented '100' and '200' for FIG. 4 and FIG. 5, respectively.

Figure 8:
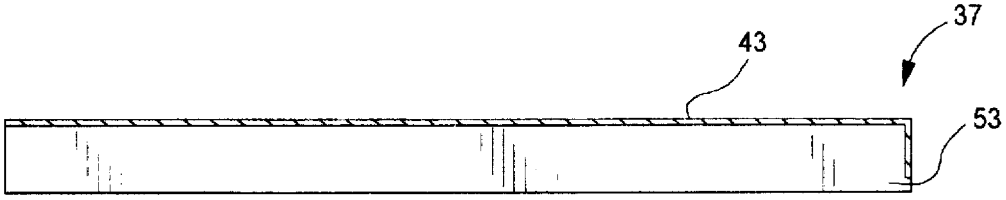
FIG. 8 shows a rear cut inside view of the top plate shown in FIG. 6.
Figure 6:
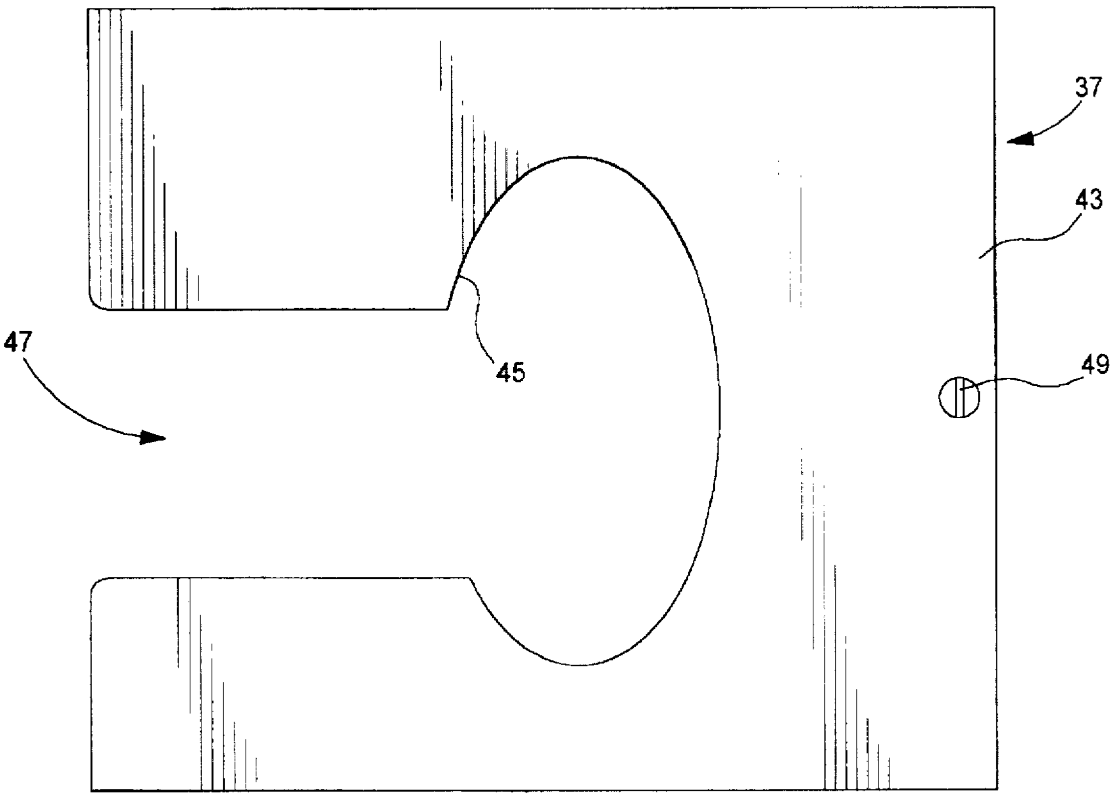
FIG. 6 shows a top view of a present invention top plate which covers the main housing shown in FIG. 1.
Figure 7:
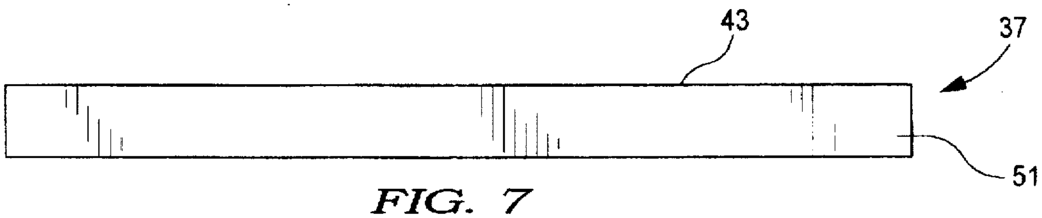
FIG. 7 shows a front view of the top plate shown in FIG. 6.

FIGS. 6, 7 and 8 shows the top plate 37, which gets placed over a computer monitor, which is placed on top of the CPU. The top plate 37 can be slide into the main housing 1 without disconnecting the serial and parallel port and other cable connections.

The top plate 37 includes a top 43, having an approximate T-shaped yoke cut-out portion 45 sized and shaped to movably engage a side of a neck of the computer monitor, an open portion 47 extending from an outer edge of the top plate 37 into the approximate T-shaped yoke cut-out portion 45 and a lock 49. The approximate T-shaped yoke cut-out portion 45 has a diameter which is greater than the diameter of the computer monitor and is greater than the distance between opposite edges of the open portion 47.

The top plate 37 is the positioning means. When the top plate 37 is not inserted into the main housing 1 and the monitor is stacked on top of the CPU which is inserted into the storage portion 3, the positioning means is in it first, open position. When the top plate 37 is inserted and locked into the main housing 1 by sliding the top plate 37 under the ledge 35 and locking the lock 49, the positioning means is in its second closed position.

The lock 49 connects the top plate 37 and the main housing 1 through an anchor which engages the tab hole 33 (see FIG. 1). The front of the top plate 37 includes a ledge 51 and the back of the top plate 37 also has a ledge 53.

Figure 9:
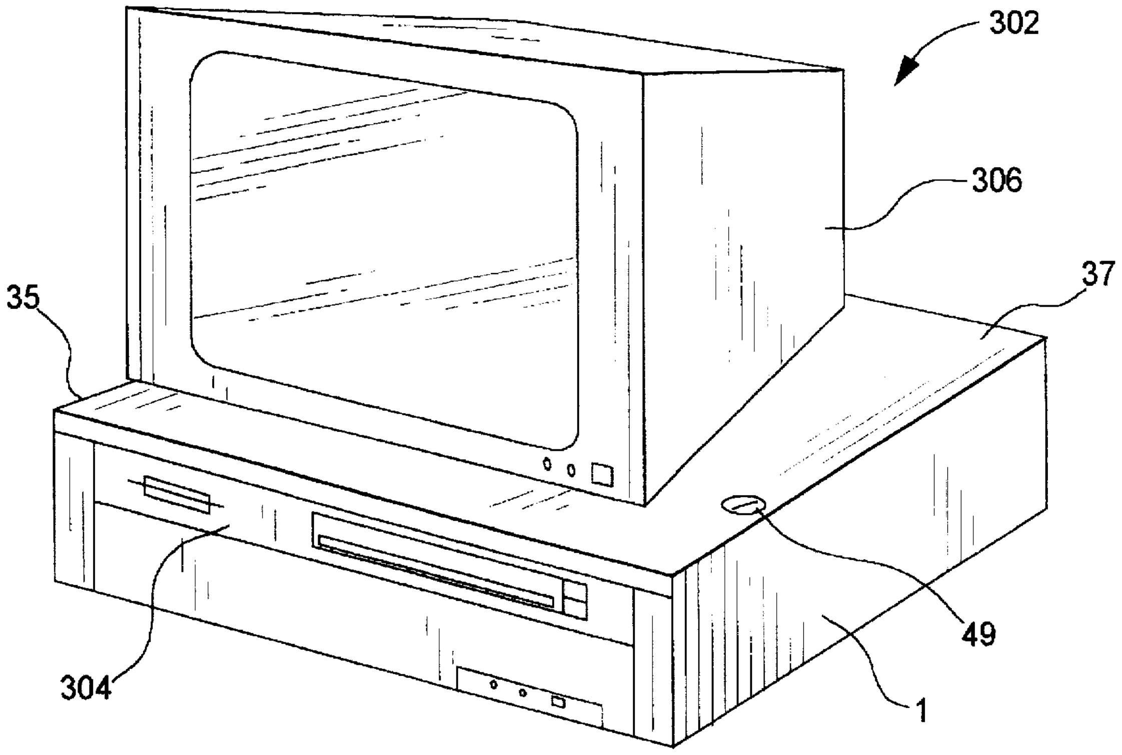
FIG. 9 shows a perspective view of a present invention device with the top plate shown in FIG. 6 connected to the main housing shown in FIG. 1.

FIG. 9 shows a present invention device 302 with a CPU 304 and a computer monitor 306 locked into place. The CPU 304 is slid into the main housing 1 and the monitor 306 is placed on top of the CPU 304. The top plate 37 is then fitted into place by placing the top plate under the ledge 35 and securing and locking it to the main housing 1 by locking the lock 49. Thus, access to the table securing means is prevented and the computer components 304, 306 are secured.

What is claimed is:

1. A computer component securing device, which comprises:

(a) a main housing having a storage portion and a pair of table securing portions, said storage portion having a bottom, sidewalls, and a partially open front, said table securing portions each having a bottom, an outer sidewall and a back and having at least one cut-out in said bottoms for passing a table securing device at least partially therethrough;

(b) a positioning means for positioning a first computer component and a second computer component so as to have a first, open position wherein the first computer component may be inserted and removed from said storage portion and the second computer component may be stacked on top of the first computer component and so as to have a second, closed position such that an inserted first computer component and a stacked second computer component cannot be removed therefrom, but so as to expose the functional aspects of the first computer component and the second computer component for utilization by a user when said positioning means is in its second, closed position, said positioning means being connected to said main housing;

(c) locking means connected to said positioning means and said main housing and being adapted so as to permit locking and unlocking of said positioning means and said main housing when said positioning means is in its second, closed position; and, (d) clamp-type table securing means extending through said at least one opening in said main housing and connected to said main housing inside said main housing, and having an attachment mechanism outside of said main housing which is securably connectable to a table, wherein said table securing means may be attached to a table from operating it from the inside of said main housing by rotation of a screw-mechanism located entirely within said main housing and, when said positioning means is in its second, closed position and is locked, said table securing means screw-mechanism is unaccessible and said table securing means cannot be unattached from said table without damaging said device or a table to which it is attached.

2. The device of claim 1, wherein said clamp type table securing means includes at least one C-clamp.

3. The device of claim 2 wherein said table securing portions further include a channel extending along an inner dimension of said sidewalls.

4. The device of claim 3 wherein one of said table securing portions includes a tab hole projecting from below a top edge of said outer sidewall.

5. The device of claim 4 wherein another of said table securing portions includes a ledge extending over a top of said one table storage portion.

6. The device of claim 5 wherein said positioning means includes a top plate connected to said main housing on one side by inserting said position means under said ledge of said another table securing portion and connected on another side by said locking means mated to said tab hole on said one table securing portion.

7. The device of claim 6 wherein said top plate includes a top having an approximate T-shaped yoke cut out portion sized and shaped to movably engage a side of a neck of a computer monitor.

8. The device of claim 7 wherein said top plate further includes an open portion extending from an outer edge of said top plate into said approximate T-shaped yoke cut-out portion, said open portion sized and shaped to engage a diameter of the neck of the computer monitor.

9. The device of claim 8 wherein a diameter of said approximate T-shaped yoke cut-out portion of said top plate is greater than a diameter of the neck of the computer monitor.

10. The device of claim 9 wherein said diameter of said approximate T-shaped yoke cut-out portion is greater than a distance between opposite edges of said open portion.

11. The device of claim 10 wherein said partially open front of said storage portion includes an aperture sized and shape to access the functional aspects of the first computer component.

12. The device of claim 11 wherein a back of said storage portion is open whereby the functional aspects of the first computer component are exposed.

13. The device of claim 12 wherein said table securing portions further include a channel extending along an inner dimension of said sidewalls.

14. The device of claim 13 wherein one of said table securing portions includes a tab hole projecting from below a top edge of said outer sidewall.

15. The device of claim 14 wherein another of said table securing portions includes a ledge extending over a top of said one table storage portion.

16. The device of claim 15 wherein one of said table securing portions includes a ledge extending over a top of said one table storage portion.

17. The device of claim 16 wherein said positioning means includes a top plate connected to said main housing under said ledge of said one table securing portion and by said locking means mated to said tab hole on said another table securing portion.

18. The device of claim 17 wherein said top plate includes a top having an approximate T-shaped yoke cut out portion sized and shaped to movably engage a side of a neck of a computer monitor.

* * * * *